US010214287B2

(12) United States Patent
Valentine, Jr.

(10) Patent No.: US 10,214,287 B2
(45) Date of Patent: Feb. 26, 2019

(54) VEHICLE CABIN WAYFINDING ASSEMBLY

(71) Applicant: THE BOEING COMPANY, Chicago, IL (US)

(72) Inventor: William Hanson Valentine, Jr., Mill Creek, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/054,767

(22) Filed: Feb. 26, 2016

(65) Prior Publication Data

US 2017/0247111 A1 Aug. 31, 2017

(51) Int. Cl.

| | |
|---|---|
| ***B64D 11/00*** | (2006.01) |
| ***B64D 47/02*** | (2006.01) |
| ***B60Q 3/00*** | (2017.01) |
| ***F21V 7/00*** | (2006.01) |
| *B64D 45/00* | (2006.01) |

(52) U.S. Cl.

CPC ................ *B64D 11/00* (2013.01); *B60Q 3/00* (2013.01); *B64D 47/02* (2013.01); *F21V 7/0008* (2013.01); *F21V 7/0083* (2013.01); *B64D 2011/0038* (2013.01); *B64D 2045/007* (2013.01); *B64D 2203/00* (2013.01)

(58) Field of Classification Search

CPC .................... B64D 11/00; B64D 47/02; B64D 2011/0038; B64D 2045/007; B64D 2203/00; B60Q 3/00; B60Q 1/00; F21V 7/0008; F21V 7/0083

See application file for complete search history.

(56) References Cited

U.S. PATENT DOCUMENTS

| | | | | | |
|---|---|---|---|---|---|
| 1,535,985 | A | | 4/1925 | Clark | |
| 1,931,577 | A | * | 10/1933 | Easterday | G09F 13/04 362/294 |
| 2,129,399 | A | * | 9/1938 | Binder | G09F 15/0075 40/584 |
| 2,250,954 | A | * | 7/1941 | Hagerty | B60Q 3/43 362/479 |
| 2,337,794 | A | * | 12/1943 | Arenberg | F21V 5/00 362/479 |
| 2,363,186 | A | * | 11/1944 | King | A47F 1/00 40/646 |
| 2,421,277 | A | * | 5/1947 | Luce | G09F 13/16 359/542 |

(Continued)

FOREIGN PATENT DOCUMENTS

| | | |
|---|---|---|
| GB | 478346 | 1/1938 |
| WO | WO 2005/022202 | 3/2005 |

OTHER PUBLICATIONS

Extended European Search Report for EP 17152565.2-1754, dated Jul. 19, 2017.

*Primary Examiner* — Daniel I Walsh

(74) *Attorney, Agent, or Firm* — Philip S. Hof; The Small Patent Law Group, LLC

(57) ABSTRACT

A vehicle cabin wayfinding assembly is configured to be secured within an internal cabin of a vehicle. The vehicle cabin wayfinding assembly may include a placard having a front face, and at least one directional reflector offset from the front face of the placard. The directional reflector(s) defines one or more indicia, and is configured to directionally reflect light that is emitted from a light source into an application zone.

22 Claims, 7 Drawing Sheets

100 104 120 104 120 122 104 108 116 104 104b 104b 104b 104c 120 122 114 102 106 124 124 112 112 23 C B A O L 104a 110 111 L 120

(56) References Cited

U.S. PATENT DOCUMENTS 3,211,904 A * 10/1965 Schwenkler ............. B60Q 3/43 362/224
3,951,529 A * 4/1976 Gandia .................. G03B 25/00 352/100
4,116,540 A * 9/1978 Thomas ................... G02B 5/10 359/869
4,139,957 A * 2/1979 Minogue ................. G09F 13/04 40/572
4,442,359 A * 4/1984 Lederer ................ G08B 13/193 250/342
4,765,080 A * 8/1988 Conti ........................ G09F 7/10 40/465
5,006,966 A * 4/1991 Mikalonis ................ B60Q 3/43 362/224
5,076,196 A * 12/1991 Chan ...................... B60Q 7/005 116/28 R
5,113,322 A * 5/1992 Mikalonis ................ B60Q 3/43 362/224
5,129,597 A * 7/1992 Manthey .............. B64D 11/003 244/118.5
5,237,766 A * 8/1993 Mikolay ............. G09F 13/0409 40/454
5,347,434 A * 9/1994 Drake .................... B64D 11/00 244/118.5
5,395,074 A * 3/1995 Hart ..................... B64D 11/003 244/118.1
5,450,236 A * 9/1995 Odemark ............... G02B 5/124 359/515
5,647,658 A * 7/1997 Ziadi ...................... B64D 11/00 362/471
5,677,603 A * 10/1997 Speirs .................... B64D 11/00 244/118.5
5,835,294 A * 11/1998 Minegishi ................. B60R 1/10 359/857
5,966,856 A * 10/1999 Alu ......................... G09F 13/14 40/545
6,070,993 A * 6/2000 Natsume ............. F21S 48/1233 362/309
6,082,879 A * 7/2000 Myburgh ................. B60Q 3/47 362/253
6,199,310 B1 * 3/2001 Mueller .................. F21V 7/005 362/812
6,203,180 B1 * 3/2001 Fleischmann .......... B64D 11/00 362/147
6,237,266 B1 5/2001 Tassey
6,253,477 B1 * 7/2001 Balint ..................... G09F 13/16 40/582
6,350,048 B1 * 2/2002 Stanton .................... B60N 3/02 362/478
6,389,206 B1 * 5/2002 Veligdan .................. G02B 5/08 385/115
6,507,441 B1 * 1/2003 Eisenberg ............ G02B 3/0056 359/619
6,578,795 B2 * 6/2003 Romca ................... B64D 11/00 116/209
8,210,724 B2 * 7/2012 Ying ...................... B60Q 3/005 362/479
9,527,437 B2 * 12/2016 Valentine, Jr. ........... B60Q 3/47
9,617,014 B2 * 4/2017 Abel ...................... B64D 11/00
9,731,824 B2 * 8/2017 Madhav ................. G03B 31/00
2001/0003506 A1 * 6/2001 Natsume ................. F21S 48/23 362/518
2001/0023908 A1 * 9/2001 Romca ................... B64D 11/00 244/122 R
2001/0045034 A1 * 11/2001 Mueller .................. F21V 7/005 40/564
2001/0053071 A1 * 12/2001 Yoda ....................... G09F 13/04 362/23.07
2002/0030139 A1 * 3/2002 Apel .................... B64D 11/003 244/118.5
2002/0048094 A1 * 4/2002 Witt .......................... B60R 1/02 359/839
2002/0176245 A1 * 11/2002 Fuwausa ................ B60K 35/00 362/84
2003/0019136 A1 * 1/2003 Whitman ................ G09F 21/04 40/320
2003/0031021 A1 * 2/2003 Kuisma .................... B60Q 3/43 362/484
2003/0047976 A1 * 3/2003 Hannon ................... A47C 1/12 297/331
2003/0074818 A1 * 4/2003 Bradford ............. G02B 6/0038 40/546
2003/0079387 A1 * 5/2003 Derose ................ G02B 6/0083 40/544
2004/0004844 A1 * 1/2004 Ryan, Jr. ................... G09F 9/33 362/545
2004/0144006 A1 * 7/2004 Chu ........................ G09F 19/14 40/453
2004/0163289 A1 * 8/2004 Pearson .................... G09F 7/00 40/584
2004/0173723 A1 * 9/2004 Looker ..................... B64C 1/20 248/346.02
2004/0182508 A1 * 9/2004 Apel .................... B64D 11/003 156/249
2004/0195450 A1 * 10/2004 Hiesener ................ B64D 11/00 244/118.5
2004/0213005 A1 * 10/2004 Kohlmeier-Beckmann ................ F21V 7/0008 362/471
2004/0228135 A1 * 11/2004 Myburgh ........... B60H 1/00371 362/480
2004/0232283 A1 * 11/2004 Ferry ..................... B60N 2/206 244/118.6
2004/0240054 A1 * 12/2004 Aiura ..................... G03B 21/56 359/455
2005/0002198 A1 * 1/2005 Blechschmidt ........ B64D 11/00 362/470
2005/0018430 A1 * 1/2005 Mohacsi ............... F21V 7/0016 362/300
2005/0030764 A1 * 2/2005 Spero .................. G02B 6/0086 362/559
2005/0050781 A1 * 3/2005 Duim ....................... G02B 6/04 40/606.07
2005/0050782 A1 * 3/2005 Ryan ....................... B60R 13/02 40/606.07
2005/0082430 A1 * 4/2005 Young ..................... B64C 1/066 244/119
2005/0104740 A1 * 5/2005 Stokes ................... B64D 10/00 340/815.45
2005/0117188 A1 * 6/2005 Ishihara ............... G02B 26/101 359/202.1
2005/0178910 A1 * 8/2005 Sprenger ............ B64D 11/0624 244/118.6
2005/0211841 A1 * 9/2005 Guard ..................... B64C 1/066 244/119
2006/0032979 A1 * 2/2006 Mitchell ................ B64D 11/00 244/118.6
2006/0181105 A1 * 8/2006 Puschmann ........ B64D 11/0015 296/65.01
2006/0230657 A1 * 10/2006 Kotze .................... G03B 25/02 40/454
2006/0237585 A1 * 10/2006 Lau ........................ B64D 11/00 244/118.5
2006/0265921 A1 * 11/2006 Korall ..................... G09F 13/04 40/579
2006/0279959 A1 * 12/2006 Yabashi ................. B60Q 3/745 362/490
2007/0057121 A1 * 3/2007 Callahan .................. H02G 3/32 244/118.5
2007/0095979 A1 * 5/2007 Ritts .................... B64D 11/003 244/118.1
2007/0097664 A1 * 5/2007 Stokes ..................... B60Q 3/46 362/84
2007/0107277 A1 * 5/2007 Simms ...................... G09F 3/00 40/320
2007/0109802 A1 * 5/2007 Bryan .................... B64D 11/00 362/471

(56) References Cited

U.S. PATENT DOCUMENTS

2008/0106702 A1* 5/2008 Huonker ............ B64D 11/0015 353/82
2008/0219012 A1* 9/2008 Kessler .................. B64D 11/00 362/470
2008/0219013 A1* 9/2008 Budinger ............. A61N 5/0618 362/471
2008/0219671 A1* 9/2008 Schmitt .............. H04B 10/1149 398/130
2008/0310177 A1* 12/2008 Clark ....................... B60Q 3/44 362/471
2009/0000088 A1* 1/2009 Horst .................... B64C 1/1446 24/614
2009/0000166 A1* 1/2009 Gallet ..................... G09F 13/14 40/582
2009/0015736 A1* 1/2009 Weller ...................... B60R 1/12 349/11
2009/0103320 A1* 4/2009 Clark ................... B64D 11/003 362/470
2009/0107366 A1* 4/2009 Fissette .............. B64D 11/0007 108/115
2010/0033980 A1* 2/2010 Vogel ...................... H02J 9/065 362/471
2010/0079861 A1* 4/2010 Powell ............... G02B 27/0081 359/449
2010/0177526 A1* 7/2010 Futami ................. B60Q 1/0041 362/519
2010/0201951 A1* 8/2010 Budinger ................. B60Q 3/43 353/13
2010/0218405 A1* 9/2010 Adams .................. B60N 3/004 40/320
2010/0222687 A1* 9/2010 Thijs .................. A61B 5/02438 600/508
2010/0254114 A1* 10/2010 Yoshimi ............... G02B 27/286 362/19
2010/0302072 A1* 12/2010 Larcher .................... B60Q 1/50 340/945
2010/0326939 A1* 12/2010 Clark .................... A47F 5/0025 211/153
2011/0000110 A1* 1/2011 Wang ..................... G02B 5/045 40/299.01
2011/0023338 A1* 2/2011 Ellerton ................. G08G 5/065 40/564
2011/0069958 A1* 3/2011 Haas .................. H04B 10/1149 398/77
2011/0133028 A1* 6/2011 Riedel ................. B60R 11/0235 244/118.5
2011/0163697 A1* 7/2011 Mizukami .............. B60Q 3/745 315/324
2011/0279741 A1* 11/2011 Smallhorn ......... B64D 11/0015 348/837
2012/0176808 A1* 7/2012 Rust ....................... B64D 11/00 362/470
2012/0194638 A1* 8/2012 Smalley ................... G03H 1/02 348/41
2012/0292986 A1* 11/2012 Riedel .................... B64D 11/00 307/9.1
2012/0313794 A1* 12/2012 Riedel .................... B64D 11/00 340/945
2014/0050901 A1* 2/2014 Adams ................... B64D 45/00 428/196
2014/0125355 A1* 5/2014 Grant ..................... B64D 11/06 324/629
2014/0253335 A1* 9/2014 Curtis ...................... G08B 5/00 340/573.1
2014/0307453 A1* 10/2014 Ohta ...................... B64D 11/00 362/471
2014/0313751 A1* 10/2014 Abel ...................... B64D 47/02 362/464
2014/0340916 A1* 11/2014 Riitner ................. B60Q 3/0286 362/470
2015/0001341 A1* 1/2015 Ersan ..................... B64D 11/06 244/118.6
2015/0008282 A1* 1/2015 Boomgaarden .... B64D 11/0015 244/118.5
2015/0151679 A1* 6/2015 Aruga .................... B64D 47/02 362/470
2015/0166178 A1* 6/2015 Savian ................... B64D 11/00 244/118.6
2015/0251594 A1* 9/2015 Timm .................... B64D 11/00 362/471
2015/0266418 A1* 9/2015 Salter ................. H05B 37/0218 362/510
2016/0090192 A1* 3/2016 Dunn ................. B64D 11/0015 340/945
2016/0264243 A1* 9/2016 Madhav ................. G03B 31/00
2017/0094167 A1* 3/2017 Riedel .................. H04N 13/218
2017/0101183 A1* 4/2017 Lutzer ................ B64D 11/0015
2017/0247111 A1* 8/2017 Valentine, Jr. ......... B64D 11/00
2017/0368990 A1* 12/2017 Blacken ................... B60Q 3/62

* cited by examiner

VEHICLE CABIN WAYFINDING ASSEMBLY

FIELD OF THE DISCLOSURE

Embodiments of the present disclosure generally relate to a vehicle cabin wayfinding assembly, such as may be used to direct a passenger to a seat position within a vehicle cabin.

BACKGROUND OF THE DISCLOSURE

Various vehicles include an internal cabin that houses numerous passenger seats. The passenger seats may be arranged in rows within the internal cabin. For example, a commercial airplane may include rows of seats with one or more aisles extending through the rows. A row of seats may include a first set of two outboard seats separated from a middle section of three or more seats, which are in turn separated by a second set of two outboard seats that are on an opposite side of the internal cabin than the first set of outboard seats. In order to allow passengers to find their seats within the internal cabin, seat signs are secured above the rows of seats. As an example, seat signs may be secured above or below overheard baggage bins that are above one or more of the seats within a particular row.

Typically, a seat sign is or otherwise includes a flat plastic placard that is unlit. Seat numbers may be printed on the flat placard. However, many passengers may not notice the sign, or may find it difficult to discern seat numbers thereon, as they walk through an aisle of a vehicle trying to find their seats. Accordingly, a passenger boarding process may be extended and, in general, take longer than expected, which may delay departure of the vehicle. In short, a typical seat sign often lacks readily discernable or even subtle clues that quickly and efficiently direct passengers to their assigned seats.

SUMMARY OF THE DISCLOSURE

A need exists for a system, method, and assembly that efficiently, reliably, and quickly direct passengers aboard a vehicle to their seats. A need exists for an assembly that is easily discernable by passengers, and which allows for quick and efficient boarding of the vehicle.

With those needs in mind, certain embodiments of the present disclosure provide a vehicle cabin wayfinding assembly that is configured to be secured within an internal cabin of a vehicle. The vehicle cabin wayfinding assembly may include a placard having a front face, and at least one directional reflector offset from the front face of the placard. The directional reflector(s) defines one or more indicia, and is configured to directionally reflect light that is emitted from a light source into an application zone.

An orthogonal axis is normal to the planar front face of the placard. The directional reflector(s) is configured to receive the light from the light source. The directional reflector(s) is configured to directionally reflect the light toward a direction in which individuals approach the vehicle cabin wayfinding assembly. The directionally-reflected light has an intensity within the application zone that is higher than outside of the application zone.

The directional reflector(s) may be shaped as one or more wayfinding indicia. In at least one other embodiment, the directional reflector(s) surrounds at least one planar area of the front face that is shaped as one or more wayfinding indicia.

The directional reflector(s) may include a plurality of parallel reflector segments separated by gaps. A height to depth aspect ratio of the directional reflector(s) may be constant. The directional reflector(s) may include a vertically convex reflective surface that outwardly bows away from the front face of the placard.

The application zone may be defined between a minimum reflection angle and a maximum reflection angle. The minimum reflection angle may be determined by an inboard perspective that extends upwardly from an outboard-most surface of an inboard seat that is separated from an inboard-most surface of an outboard seat by an aisle. The maximum reflection angle may be determined by an outboard perspective that extends upwardly from the inboard-most surface of the outboard seat that is separated from the outboard-most surface of the inboard seat by the aisle. In at least one embodiment, the inboard perspective is at a first height that is a ninety-fifth percentile of male human height, and the outboard perspective is at a second height that is a fifth percentile of female human height.

The directional reflector(s) may include at least one reflective surface that is horizontally concave and vertically convex. In at least one embodiment, the directional reflector(s) may include a plurality of reflective units. A reflective surface of each of the plurality of reflective units may be horizontally concave and vertically convex.

Certain embodiments of the present disclosure provide a vehicle that may include a fuselage defining an internal cabin, at least one light source within the internal cabin, and a vehicle cabin wayfinding assembly secured within the internal cabin. The vehicle cabin wayfinding assembly may include a placard having a front face, and at least one directional reflector offset from the front face of the placard. The directional reflector(s) defines one or more indicia, and directionally reflects light that is emitted from the at least one light source into an application zone.

Certain embodiments of the present disclosure provide a method of efficiently directing passengers aboard a vehicle. The method may include emitting light from a light source that is not directly visible to the passengers towards a vehicle cabin wayfinding assembly that is proximate to a row of seats, and directionally reflecting the emitted from the light source with at least one directional reflector of the vehicle cabin wayfinding assembly into a defined application zone extending into an aisle of the vehicle cabin. The directionally reflecting operation may include reflecting light at an increased intensity within the application zone, and not reflecting light or reflecting light at a decreased intensity outside of the application zone.

DETAILED DESCRIPTION OF THE DISCLOSURE

Figure 1:
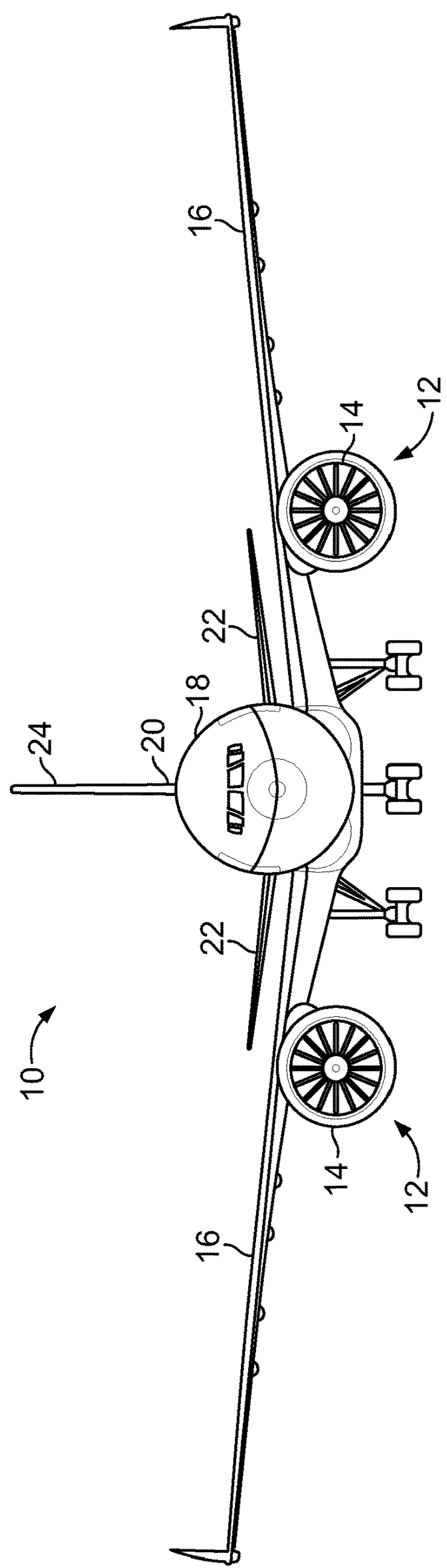
FIG. 1 illustrates a front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a vehicle cabin wayfinding assembly that allows for intuitive and efficient boarding of a vehicle, such as a commercial airplane. The vehicle cabin wayfinding assembly may provide a passively-illuminated device that reflects light from a separate and distinct light source. As such, the wayfinding assembly may be illuminated without the use of an additional power source or integral lighting assembly.

Certain embodiments of the present disclosure provide a reflective vehicle cabin wayfinding assembly, which may include a placard and one or more directional reflectors coupled to the placard. A light source, such as cross-aisle lighting assembly having one or more light emitting diodes (LEDs) shines on the vehicle cabin wayfinding assembly, such as from across an aisle. The directional reflector(s) are configured to redirect and reflect the light emitted from the lighting assembly into a defined application zone, such that passengers entering the vehicle cabin notice the vehicle cabin wayfinding assembly as they reach an appropriate station of the airplane where the vehicle cabin wayfinding assembly presents passengers with relevant seating information and/or various other types of information.

Certain embodiments of the present disclosure provide a vehicle cabin wayfinding assembly that main include a placard or main body. The placard may be substantially flat or planar, and may have an orthogonal axis that is normal to the plane of the placard. The vehicle cabin wayfinding assembly is configured to receive incoming light from a direction substantially aligned with the orthogonal axis (for example, extending in a direction that is parallel with the orthogonal axis). The vehicle cabin wayfinding assembly may be configured to redirect the incoming light in a lateral direction toward a general direction in which passengers approach the vehicle cabin wayfinding assembly. The lateral direction may include a lateral domain angle and a vertical range angle. The lateral domain angle may be configured to be wide enough to engage passengers when they are within a defined proximity to the vehicle cabin wayfinding assembly in order to discern the information contained thereon. The vertical range angle may be configured to a be wide enough to engage a particular percentile male height and a particular percentile female height such that substantially all persons in a target audience will notice the vehicle cabin wayfinding assembly within the lateral domain angle while the beam is still narrow enough in the vertical range angle to maintain substantial brightness and avoid directing light in errant directions.

Certain embodiments of the present disclosure provide a method of vehicle wayfinding. The method may include moving an individual relative to a vehicle in a direction until the individual enters an application zone, reflecting light within the application zone, conveying information to the user while the user is positioned within the application zone, and seating the individual. The zone may be within a portion of an aisle of the vehicle. The information may be passenger wayfinding information (such as row and seat number).

Certain embodiments of the present disclosure provide an informational and/or decorative vehicle cabin wayfinding assembly including a portion that is reflective in a particular direction or zone such that an individual is engaged by a reflection when the individual enters a particular location. The vehicle cabin wayfinding assembly may provide a zonal-controllable reflective surface including one or more directional reflectors that may include arcuate, outwardly bowed reflective surfaces. The directional reflector(s) may be arranged to define letters, numbers, symbols, or other such graphics. In at least one other embodiment, the vehicle cabin wayfinding assembly may include recessed areas shaped as letters, numbers, symbols, or other such graphics formed between and/or within portions of directional reflectors.

FIG. 1 illustrates a front view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), and one or more passenger sections (for example, first class, business class, and coach sections. Each of the sections may be separated by a cabin transition area, which may include one or more class divider assemblies. Overhead stowage bin assemblies may be positioned throughout the internal cabin.

Figure 2A:
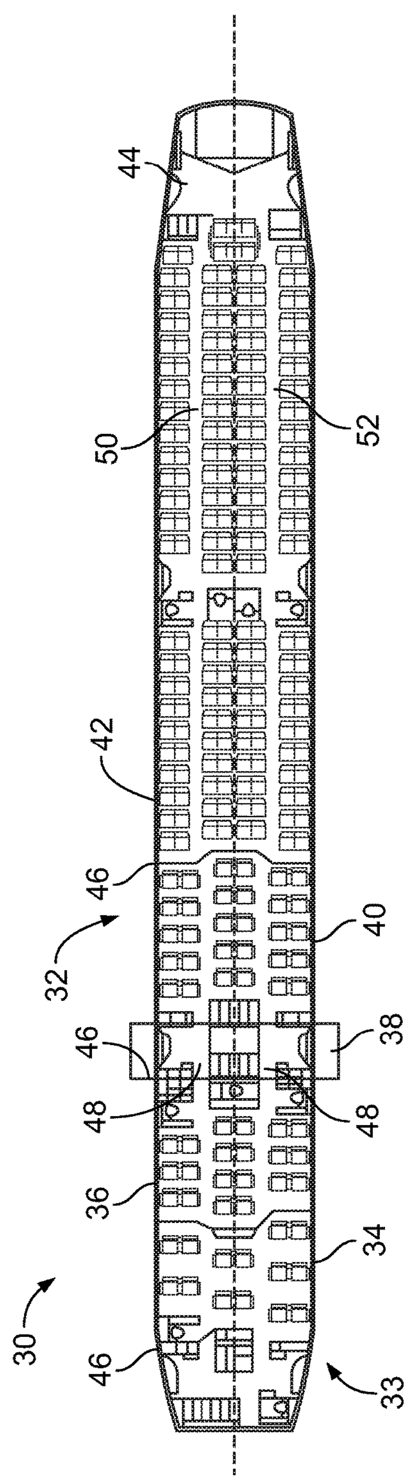
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
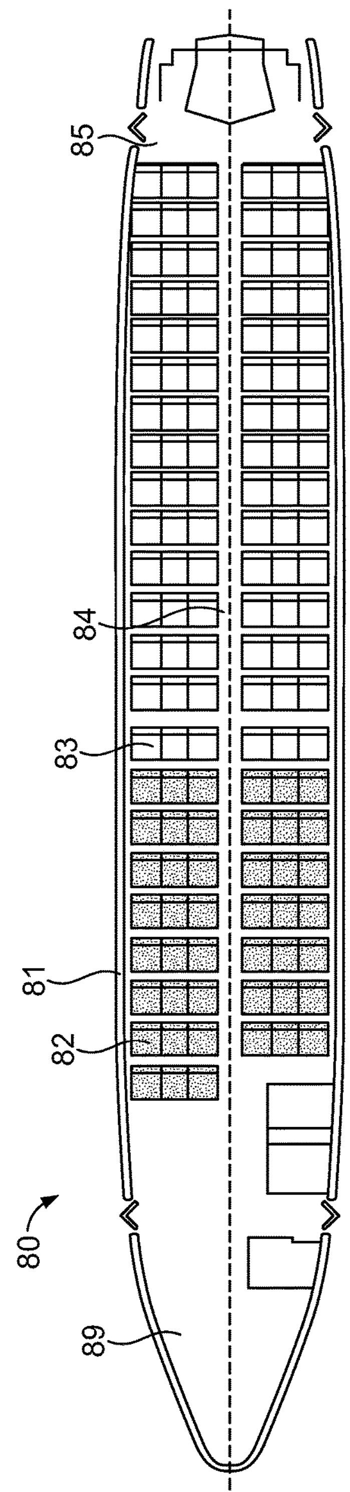
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a cockpit 89, a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Referring to FIGS. 2A and 2B, an aircraft may include numerous rows of seats within an internal cabin. Embodiments of the present disclosure provide vehicle cabin wayfinding assemblies positioned above the rows of seats proximate to the aisles. The vehicle cabin wayfinding assemblies efficiently and intuitively direct passengers to their seats during a board process.

Alternatively, instead of an aircraft, embodiments of the present disclosure may be used with various other vehicles, such as automobiles, buses, locomotives and train cars, watercraft, spacecraft, and the like.

Figure 3:
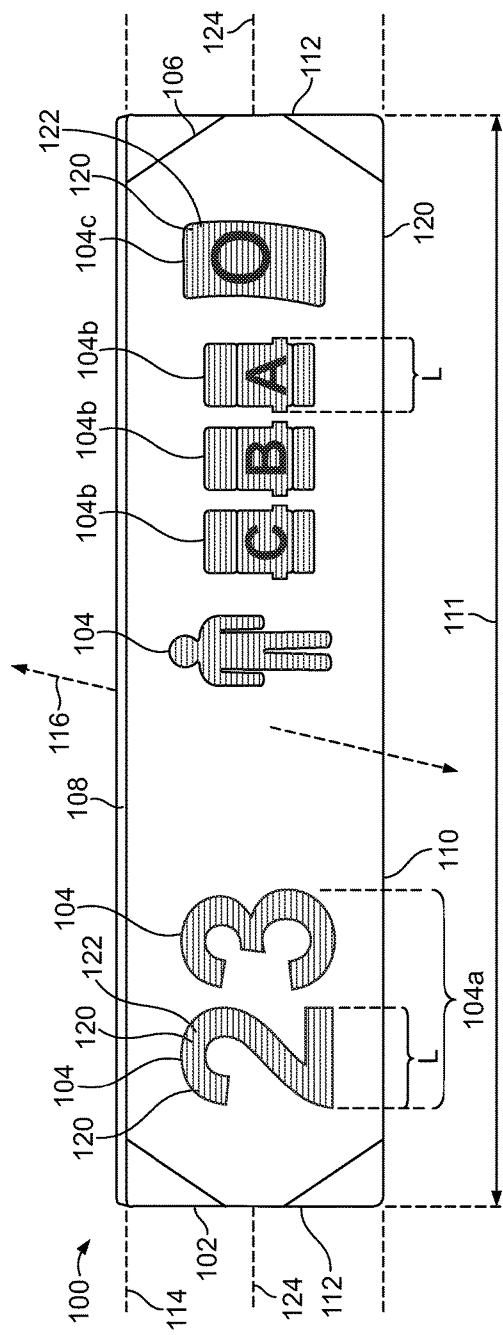
FIG. 3 illustrates a perspective front view of a vehicle cabin wayfinding assembly oriented to reflect light emitted from a light source at an application angle, according to an embodiment of the present disclosure.

FIG. 3 illustrates a perspective front view of a vehicle cabin wayfinding assembly 100 oriented to reflect light emitted from a light source (not shown in FIG. 3) at an application angle, according to an embodiment of the present disclosure. The application angle is an angle at which the emitted light is reflected at a maximized or otherwise increased intensity (for example, increased brightness). When the vehicle cabin wayfinding assembly 100 is oriented outside of the application angle, the intensity of the reflected light is minimized or otherwise decreased.

The vehicle cabin wayfinding assembly 100 may include a main body or placard 102 and one or more directional reflectors 104 coupled to the placard 102. The placard 102 may be a flat, planar member (such as a sheet, strap, or the like) having a substantially flat front face 106 that extends between an upper edge 108, a lower edge 110, and lateral edges 112. The front face 106 may be disposed within a plane 114. The placard 102 may have an orthogonal axis 116 that is normal to the plane 114. The placard 102 may be otherwise non-reflective, or at least less reflective than the directional reflectors 104.

The directional reflectors 104 are offset with respect to the front face 106. For example, the directional reflectors 104 may extend outwardly from the front face 106. In at least one other embodiment, the directional reflectors 104 may extend inwardly from the front face 106. In at least one other embodiment, the directional reflectors 104 may partially inwardly protrude into and/or partially outwardly protrude from the front face 106. The directional reflectors 104 may be shaped to define wayfinding indicia, such as an aisle number 104*a*, seat positions 104*b*, a window position 104*d*, and/or the like. The directional reflectors 104 are sized and shaped to directionally reflect light from the light source into the application angle, as described below. Each directional reflector 104 may include a plurality of parallel reflector segments 120 separated by gaps 122. As shown, the directional reflectors 104 may be parallel with a longitudinal axis 124 of the vehicle cabin wayfinding assembly 100. Alternatively, the directional reflectors 104 may not include segments separated by gaps. Instead, each directional reflector 104 may be formed as a single contiguous feature.

As noted, the directional reflectors 104 may outwardly extend from the front face 106 of the placard 102 and may be shaped as wayfinding indicia (or at least portions thereof). In at least one other embodiment, the directional reflectors 104 may surround non-reflective planar areas of the front face 106 of the placard 102 that form the wayfinding indicia. Accordingly, one or more directional reflectors 104 may define the wayfinding indicia.

The placard 102 may be formed of plastic. In at least one embodiment, the directional reflectors 104 are machined out of the plastic. The directional reflectors 104 may be coated with a reflective coating, such as chrome paint, other types of reflective pain, a mirrored surface, and/or the like. In at least one embodiment, the placard 102 may be formed of a reflective material, and the areas that surround the directional reflectors 104 may be coated with a non-reflective, opaque coating. In at least one embodiment, the vehicle cabin wayfinding assembly 100 may be formed of injection-molded plastic. In at least one other embodiment, the vehicle cabin wayfinding assembly 100 may be formed as a stamped material (such as Mylar) in which the directional reflectors 104 are press-formed in relation to the placard 102. In at least one embodiment, the directional reflectors 104 may be formed as clear, transparent structures and a colored background may be disposed behind the directional reflectors 104. Accordingly, the directional reflectors 104 may directionally reflect illuminated colored light from the background.

As noted above, when the vehicle cabin wayfinding assembly 100 is oriented such that emitted light from a light source is reflected into the application angle, the directional reflectors 104 directionally-reflect the light from the light source at an increased intensity into an application zone defined by the application angle. The application angle may be a vertical range angle defined between an upper vertical limit and a lower upper vertical limit. The vertical range angle may be laterally constrained by a lateral domain angle. The application zone may be defined by the vertical range angle and the lateral domain angle. By reflecting emitted light into the application zone, the directional reflectors 104 define wayfinding indicia that are easily discernable.

Figure 4:
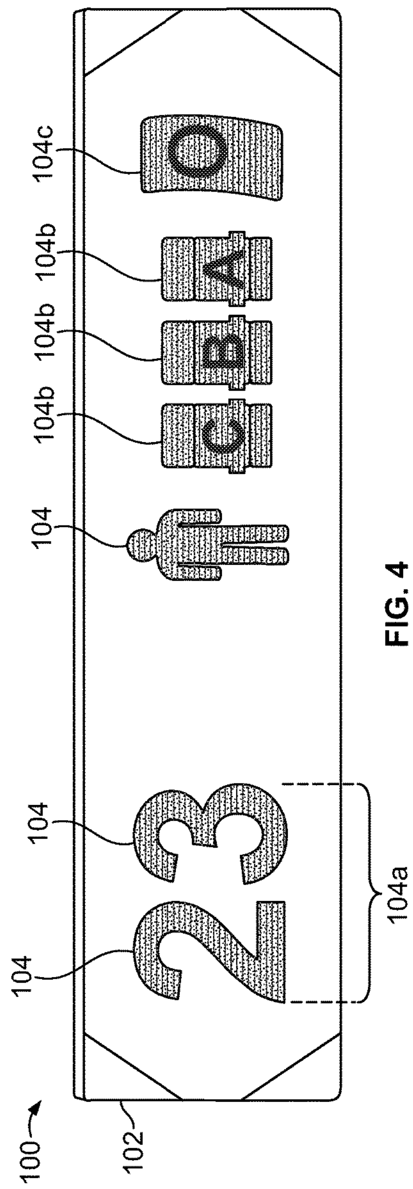
FIG. 4 illustrates a perspective front view of a vehicle cabin wayfinding assembly oriented outside of an application angle, according to an embodiment of the present disclosure.

FIG. 4 illustrates a perspective front view of the vehicle cabin wayfinding assembly 100 oriented outside of the application angle, according to an embodiment of the present disclosure. As shown, when the vehicle cabin wayfinding assembly 100 is oriented at an angle outside of the application angle in relation to the light source, the directional reflectors 104 are dimmed or optionally not illuminated. That is, the directional reflectors 104 do not reflect emitted light or reflect emitted light from the light source at a decreased intensity when the vehicle cabin wayfinding assembly 100 is oriented outside of the application angle. That is, light is either not reflected, or reflected at a dimmed intensity outside of the application angle.

Figure 5:
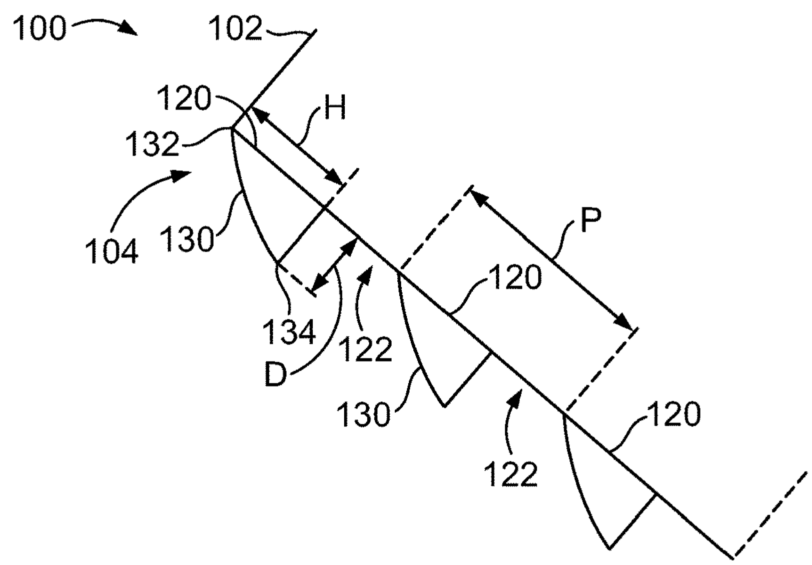
FIG. 5 illustrates a lateral, close-up view of directional reflector segments outwardly extending from a placard of a vehicle cabin wayfinding assembly, according to an embodiment of the present disclosure.

FIG. 5 illustrates a lateral, close-up view of reflector segments 120 outwardly extending from the placard 102 of the vehicle cabin wayfinding assembly 100, according to an embodiment of the present disclosure. As noted, the directional reflectors 104 may be formed by a plurality of reflector segments 120 separated by gaps 122.

Each reflector segment 104 may extend a particular length L (shown in FIG. 3) over a portion of the overall length 111 (shown in FIG. 3) of the vehicle cabin wayfinding assembly 100. Each reflector segment 104 may extend a particular height H in relation to the placard 102. Further, each reflector segment 104 may outwardly extend a depth D from the front face 106 of the placard 102. An outwardly-bowed, vertically convex (that is, convex in relation to a vertical axis) reflective surface 130 extends from an upper point 132 of the height H to an outermost base point 134 of the depth D. An H:D aspect ratio may be maintained for all of the reflector segments 104 in order to uniformly directionally reflect light into the application zone. That is, the H:D aspect ratio may be constant for the directional reflector(s) 104. The H:D aspect ratio may be tuned based on the angle of the placard 102 within a vehicle, and the desired application angle that defines the application zone. For example, the H:D aspect ratio for all of the reflector segments 104 may be 56:32, Optionally, the H:D aspect ratio may be greater or less than 56:32, In at least one embodiment, the height H of each reflector segment 104 may be 0.56 mm, the depth D of each reflector segment 104 may be 0.32 mm, and the arcuate radius of the reflective surface 130 may be 1.41 mm between the upper point 132 to the outermost base point 134. Optionally, the height H, the depth D, and the reflective surface 130 may be greater or less than noted. If the height H and the depth D are increased in size, the H:D aspect ratio is maintained in order to directionally-reflect light energy into the application zone.

The pitch P between neighboring (that is, closest) reflector segments 104 may also be maintained to provide consistent gaps 122. In at least one embodiment, the pitch P between neighboring reflector segments 104 may be 1 mm. Alternatively, the pitch P may be greater or less than 1 mm.

Figure 6:
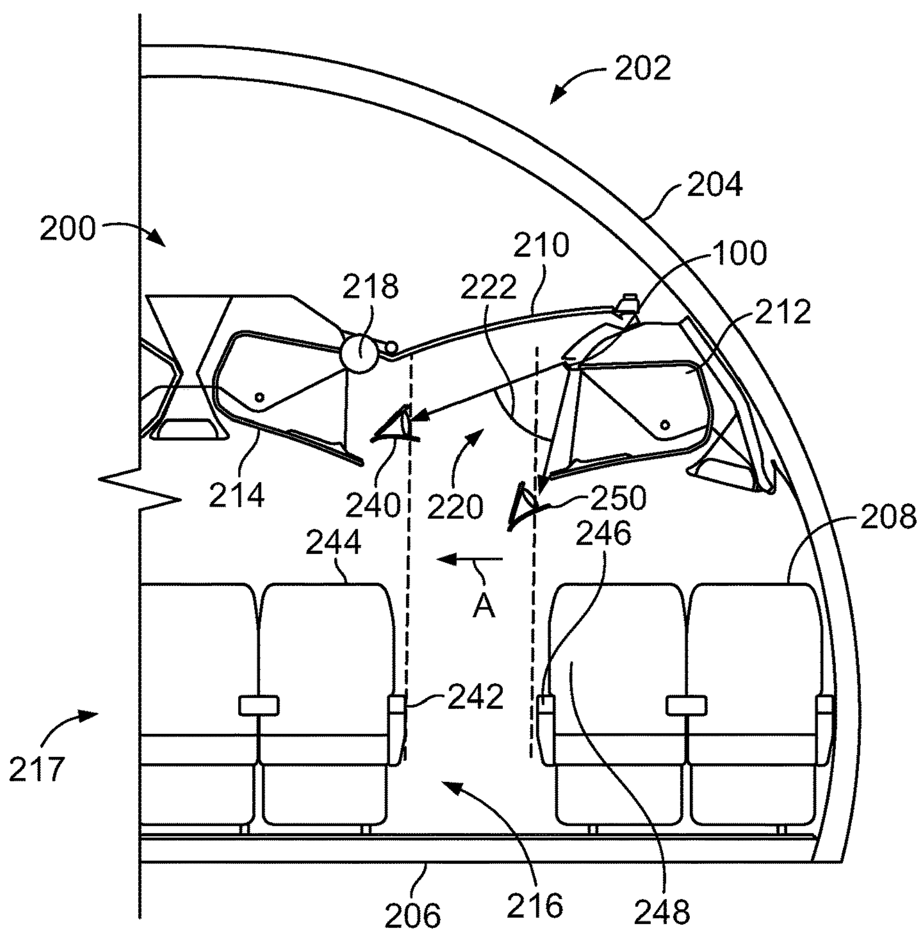
FIG. 6 illustrates a simplified partial internal view of an internal cabin of a vehicle, according to an embodiment of the present disclosure.

FIG. 6 illustrates a simplified partial internal view of an internal cabin 200 of a vehicle 202, according to an embodiment of the present disclosure. The internal cabin 200 is within a fuselage 204 of the vehicle 202, and includes a floor 206 that supports seats 208, and a ceiling 210 that supports an outboard overhead bin 212 and an inboard overhead bin 214. An aisle 216 separates seats 208 within a row 217.

A vehicle cabin wayfinding assembly 100 may be secured above the outboard overhead bin 212 across the aisle 216 from a light source, such as a lighting assembly 218 (which may be a cross-aisle LED lighting assembly). The lighting assembly 218 may not be directly visible by passengers within the internal cabin 200. Instead, the lighting assembly 218 may be hidden by a ceiling panel, for example. The lighting assembly 218 emits light through an opening formed in a portion of the internal cabin, such as channel formed through a ceiling panel. The vehicle cabin wayfinding assembly 100 is oriented at an angle such that light emitted from the lighting assembly 218 is reflected into an application zone 220 defined by an application angle 222, such as a vertical range angle.

Figure 7:
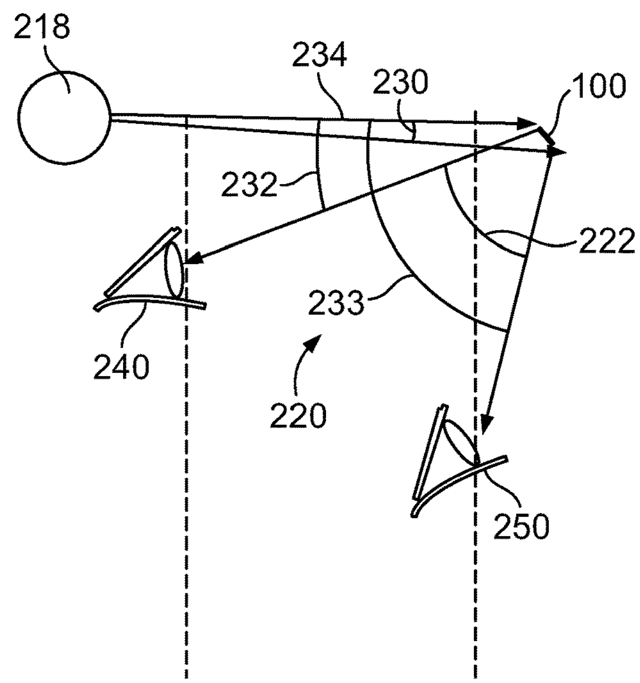
FIG. 7 illustrates a schematic view of a vehicle cabin wayfinding assembly in relation to a lighting assembly, according to an embodiment of the present disclosure.

FIG. 7 illustrates a schematic view of the vehicle cabin wayfinding assembly 100 in relation to the lighting assembly 218, according to an embodiment of the present disclosure. Referring to FIGS. 6 and 7, the lighting assembly 218 emits light at a vertical emission angle 230. For example, the vertical emission angle 230 may be 1.6 degrees. Optionally, the emission angle 230 may be greater or less than 1.6 degrees. The emitted light impinges on the front face 106 of the placard 102 (shown in FIGS. 3 and 4) and is reflected into the application zone 220 by the directional reflectors 104 (shown in FIGS. 3-5). The application angle 222 that defines the vertical portion of the application zone 220 spans between a minimum reflection angle 232 and a maximum reflection angle 233 with respect to an upper light emission boundary 234. The upper light emission boundary 234 is the upper boundary limit of light that is emitted by the lighting assembly 218.

The minimum reflection angle 232 may be defined by an inboard perspective 240. For example, the inboard perspective 240 may be a visual perspective that extends upwardly from an outboard-most surface 242 of an inboard seat 244 that is separated from an inboard-most surface 246 of an outboard seat 248 by the aisle 216. The inboard perspective 240 may be at a height that is a defined value in relation to an average height of a human being. For example, the inboard perspective 240 may be a height that is at the ninety-fifth percentile of male human height (in which height increases with increased percentile). Optionally, the inboard perspective 240 may be a height that is greater or less than the ninety-fifth percentile of male human height.

The maximum reflection angle 233 may be defined by an outboard perspective 250. For example, the outboard perspective 250 may be a visual perspective that extends upwardly from the inboard-most surface 246 of the outboard seat 248 that is separated from the outboard-most surface 242 of the inboard seat 244 by the aisle 216. The outboard perspective 250 may be at a height that is a defined value in relation to an average height of a human being. For example, the outboard perspective 250 may be a height that is at the fifth percentile of female human height. Optionally, the outboard perspective 250 may be a height that is greater or less than the fifth percentile of female human height.

It has been found that defining the application angle 222 in relation to the minimum reflection angle 232 that is set in relation to a height at the ninety-fifth percentile of male human height and the maximum reflection angle 233 that is in relation to a height at the fifth percentile of female human height provides a vertical component of the application zone 220 that is within eyesight of an overwhelming majority of airline passengers, for example. At the same time, the application zone 220 is limited as indicated in order to efficiently harvest light energy emitted by the lighting assembly 218. That is, by limiting the application zone 220 between the minimum reflection angle 232 and the maximum reflection angle 233, the vehicle cabin wayfinding assembly 100 reflects light energy that is viewable by an overwhelming majority of passengers, while at the same time efficiently reflecting the light energy of increased intensity (as opposed to dispersing the light energy over a wider application zone).

The minimum reflection angle 232 may be 21.6 degrees, while the maximum reflection angle 233 may be 72.5 degrees. Accordingly, the application angle 222 may be 50.9 degrees (72.5 degrees minus 21.6 degrees). Optionally, the minimum reflection angle 232, the maximum reflection angle 233, and the application angle 222 may be greater or less than indicated. The minimum reflection angle 222, the maximum reflection angle 233, and the application angle 222 depend on the emission angle 230, the fixed angle of the vehicle cabin wayfinding assembly 100 within the internal cabin 200, and the outward bow (for example vertically convex nature) of the reflective surfaces of the directional reflectors 214 (shown in FIGS. 3-5).

Referring to FIGS. 3-7, in operation, the cross-aisle lighting assembly 218 shines and emits light energy onto the vehicle cabin wayfinding assembly 100, such as from across the aisle 216. The directional reflector(s) 214 redirect and reflect the light emitted from the lighting assembly 218 into the application zone 220, such that passengers entering the cabin 200 notice the vehicle cabin wayfinding assembly 100 as they approach the.

The vehicle cabin wayfinding assembly 100 receives incoming light from a direction that is substantially aligned with the orthogonal axis 116 (for example, extending in a direction that is parallel with a plane in which the orthogonal axis 116 resides). The directional reflectors 214 redirect the incoming light in a lateral direction A toward a general approach direction in which passengers approach the vehicle cabin wayfinding assembly 100. The lateral direction A may include a lateral domain angle and a vertical range angle, which may together define the application zone. The lateral domain angle may be configured to be wide enough to engage passengers when they are within an defined proximity to the vehicle cabin wayfinding assembly 100 in order to receive the wayfinding information contained thereon. For example, the lateral domain angle may be as wide as a length 111 (shown in FIG. 3) of the vehicle cabin wayfinding assembly 100. Alternatively, the lateral domain angle may be greater or less than the length 111. The vertical range angle (such as the application angle 222) may be configured to be wide enough to engage a particular percentile male height and a particular percentile female height such that substantially all persons in a target audience will notice the vehicle cabin wayfinding assembly 100 within the lateral domain angle while the beam is still narrow enough in the application zone 220 to maintain substantial brightness and avoid directing light in errant directions.

It has been found that the vehicle cabin wayfinding assembly 100 reflects light energy at increased intensity and within a more controlled area when compared to a standard wayfinding sign. For example, tests were conducted with respect to a prototype of the vehicle cabin wayfinding assembly 100 and a flat plastic white matte sign. The plastic white matte sign reflected light at a maximum illuminance of 0.056 lux. Further, the plastic white matte sign diffusely reflected the light. In contrast, the vehicle cabin wayfinding assembly prototype reflected light energy at a maximum illuminance of 0.225 lux that was concentrated at a desired target area (as opposed to a diffuse reflection of light energy).

Figure 8:
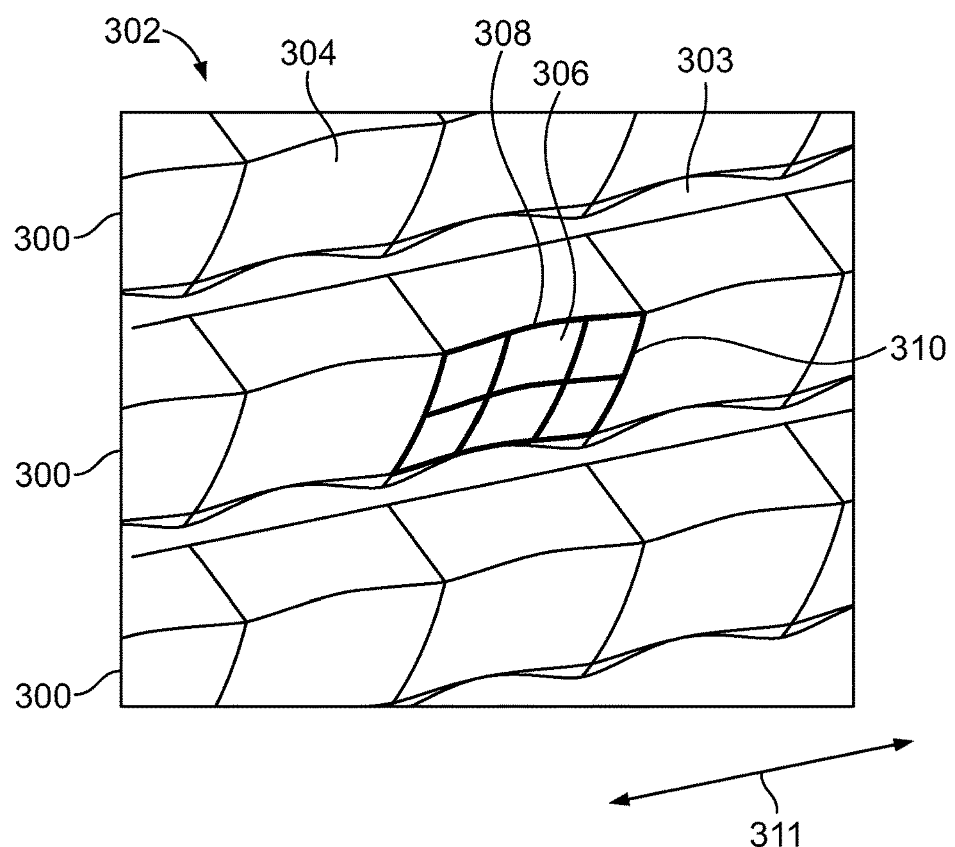
FIG. 8 illustrates a perspective front view of directional reflector segments of a vehicle cabin wayfinding assembly, according to an embodiment of the present disclosure.

FIG. 8 illustrates a perspective front view of directional reflector segments 300 of a vehicle cabin wayfinding assembly 302, according to an embodiment of the present disclosure. The reflector segments 300 may include a plurality of reflective units 304. Reflective surfaces 306 of each reflective unit 304 may be horizontally concave 308 and vertically convex 310. That is, the reflective surfaces 306 may inwardly curve toward a placard 303 in a horizontal direction, and outwardly bow away from the placard 303 in a vertical direction. The vertical convexity of the reflective surfaces 306 directs reflected light into an application zone, as described above, while the horizontal concavity of the reflective surface 306 controls the reflected light within a lateral envelope.

The horizontal concavity and vertical convexity shown in FIG. 8 may be used with any of the embodiments of the present disclosure. Moreover, instead of reflective units 304, embodiments of the present disclosure may provide directional reflectors (and/or segments) having horizontal concavity and vertical convexity over an entire length thereof (as opposed to separate and distinct reflective units).

The reflective units 306 provide a pulsating light effect as an individual moves past the vehicle cabin wayfinding assembly 302 in the direction of arrows 311. That is, as an individual walks through an aisle, the horizontal concavity of the reflective units 304 confines the reflection of light within a lateral envelope. As the individual walks through the lateral envelope, the reflected light has an increased intensity, but as the individual walks past the lateral envelope, the reflected light decreases in intensity. The individual then walks through an adjacent lateral envelope, and the process repeats, thereby providing a pulsating, flickering lighting effect to the moving individual.

Figure 9:
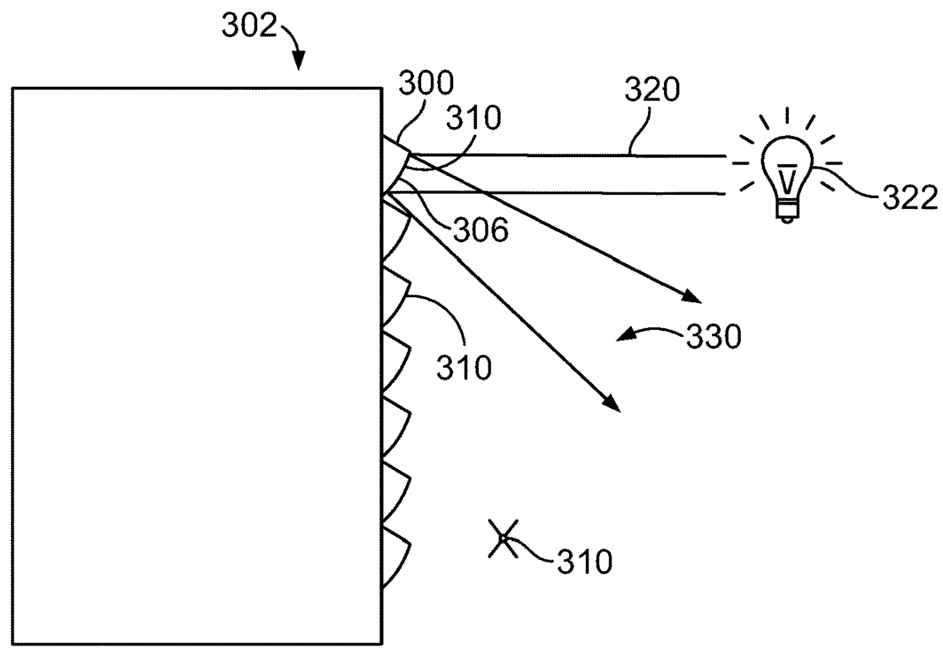
FIG. 9 illustrates a lateral view of a vehicle cabin wayfinding assembly, according to an embodiment of the present disclosure.

FIG. 9 illustrates a lateral view of the vehicle cabin wayfinding assembly 302, according to an embodiment of the present disclosure. As shown, emitted light 320 from a light source 322 reflects off the vertically convex 310 reflective surfaces 306 into an application zone 330, as described above.

Figure 10:
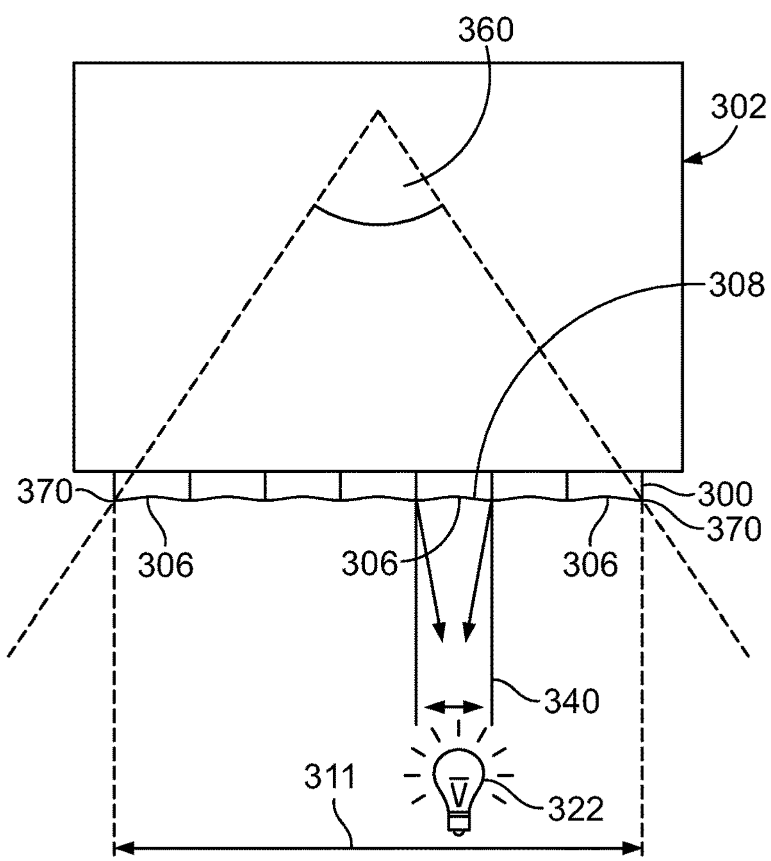
FIG. 10 illustrates a top plan view of a vehicle cabin wayfinding assembly, according to an embodiment of the present disclosure.

FIG. 10 illustrates a top plan view of the vehicle cabin wayfinding assembly 302, according to an embodiment of the present disclosure. The horizontally concave 308 reflective surfaces 306 confine the reflected light within a lateral envelope 340. Thus, as individual moves in front of the vehicle cabin wayfinding assembly 302 in directions denoted by arrows 311, the individual experiences a pulsating light effect as he/she moves through adjacent lateral envelopes 340 of reflected light.

As shown in FIG. 10, the vehicle cabin wayfinding assembly 302 may control the reflected light over a lateral domain angle 360. The lateral domain angle 360 may further be laterally constricted by the horizontally concave reflective surfaces 306 between outer lateral edges 370 of the directional reflector segments 300. Optionally, the horizontally concave reflective surfaces 306 may allow reflected light to be wider or narrower than the lateral envelopes 340 shown in FIG. 10.

As noted, the horizontal concavity of the reflective surfaces may be used with respect to any of the embodiments described above to laterally control reflected light. For example, a directional reflector (such as those described in relation to FIGS. 3-7) may be contiguous, or may include reflector segments separated by gaps. The reflective surfaces of the directional reflectors may be horizontally concave and vertically convex.

Figure 11:
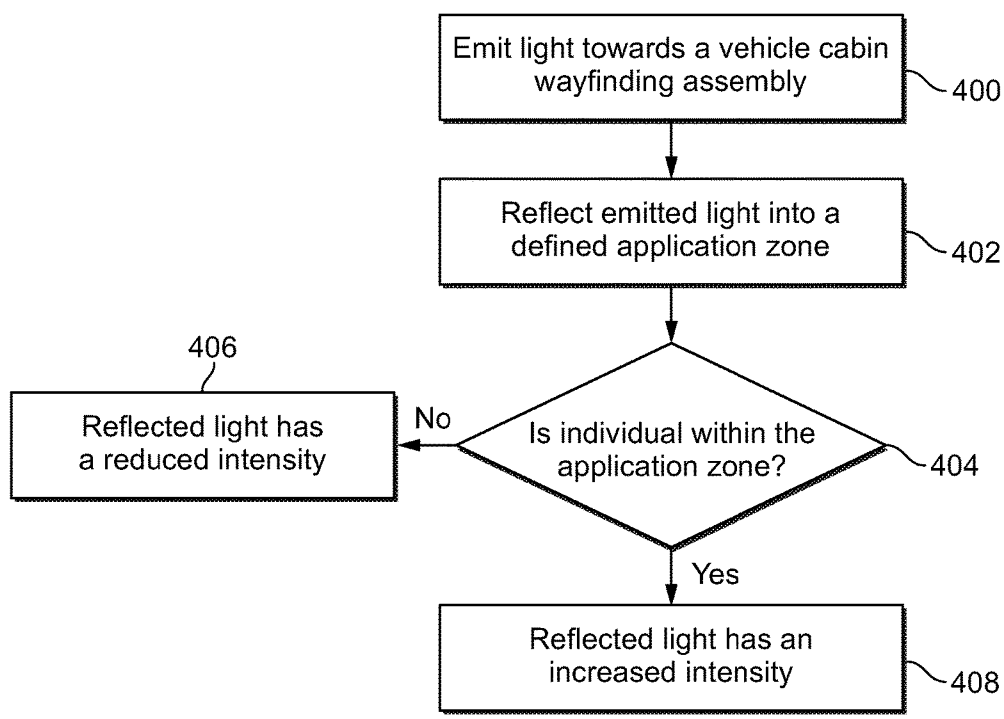
FIG. 11 illustrates a flow chart of a method of directing an individual within an internal cabin of a vehicle, according to an embodiment of the present disclosure.

FIG. 11 illustrates a flow chart of a method of directing an individual within an internal cabin of a vehicle, according to an embodiment of the present disclosure. The method beings at 400, in which light is emitted towards a vehicle cabin wayfinding assembly. At 402, the emitted light is reflected by the vehicle cabin wayfinding assembly into a defined application zone. One or more directional reflectors may reflect the emitted light into the defined application zone. The application zone is defined by the size and shape of the directional reflector(s), as well as the angle of the wayfinding assembly in relation to the source of light.

At 404, an individual within the internal cabin is either within the application zone or not. If the individual is not within the application zone, at 406, the reflected light has a reduced intensity, and, as such, indicia defined by the directional reflector(s) appear dim (or not at all) to the individual. In at least one example, no light is reflected outside of the application zone. If, however, the individual is within the application zone, at 408, the reflected light has an increased intensity, and therefore the indicia defined by the directional reflector(s) appear bright to the individual. Notably, the bright reflected light within the application zone conveys information (via the indicia) to the individual within the application zone. As such, the individual may quickly and easily determine whether or not his/her seat is within a row proximate to the application zone.

Optionally, embodiments of the present disclosure may provide indicia in addition to, or other than, seat location. For example, the wayfinding assemblies described in the present application may provide various other indicia related to area of the plane (e.g., lavatories), advertisements, safety notices, product specifications, and/or the like.

As described herein, embodiments of the present disclosure provide systems, methods, and assemblies that efficiently, reliably and quickly direct passengers aboard a vehicle in an easily-discernable manner. Embodiments of the present disclosure provide vehicle cabin wayfinding assemblies that are easily discernable by passengers, and which lead to quick and efficient boarding. The vehicle cabin wayfinding assembly is a simple and efficient assembly that is devoid of electronics or a lighting assembly. The vehicle cabin wayfinding assembly is a passive device that reflects emitted light from a separate and distinct lighting assembly (such as already aboard a vehicle) towards and into an application zone.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle cabin wayfinding assembly configured to be secured within an internal cabin of a vehicle, the vehicle cabin wayfinding assembly comprising:

a placard having a front face that extends along a vertical axis and along a longitudinal axis that is perpendicular to the vertical axis, the placard disposed above an aisle and one or more seats within the internal cabin of the vehicle; and at least one directional reflector offset from the front face of the placard and extending from the front face, wherein the at least one directional reflector defines one or more indicia, wherein the at least one directional reflector comprises at least one reflective surface that is convex along the vertical axis and concave along the longitudinal axis, and wherein the at least one directional reflector is configured to receive light that is emitted from a light source mounted within the internal cabin across the aisle from the placard such that the light passes above passengers in the aisle, the at least one directional reflector configured to directionally reflect the light received from the light source downward towards the aisle into an application zone, wherein the application zone has a defined lateral width along the length of the aisle that enables passengers that are within a threshold proximity to the vehicle cabin wayfinding assembly to view the light reflected by the at least one directional reflector.

2. The vehicle cabin wayfinding assembly of claim 1, wherein the at least one directional reflector is configured to directionally reflect the light into the application zone in a direction towards passengers that move along the aisle towards the vehicle cabin wayfinding assembly as the passengers are loading into the internal cabin.

3. The vehicle cabin wayfinding assembly of claim 1, wherein the directionally-reflected light has an intensity within the application zone that is higher than outside of the application zone.

4. The vehicle cabin wayfinding assembly of claim 1, wherein the at least one directional reflector is shaped as one or more wayfinding indicia.

5. The vehicle cabin wayfinding assembly of claim 1, wherein the at least one directional reflector surrounds at least one planar area of the front face that is shaped as one or more wayfinding indicia.

6. The vehicle cabin wayfinding assembly of claim 1, wherein the at least one directional reflector comprises a plurality of parallel reflector segments separated by gaps.

7. The vehicle cabin wayfinding assembly of claim 1, wherein the at least one reflective surface outwardly bows away from the front face of the placard.

8. The vehicle cabin wayfinding assembly of claim 1, wherein the application zone is defined vertically between a minimum reflection angle and a maximum reflection angle, wherein the minimum reflection angle is determined by a first visual perspective that extends a first designated height from the floor and is located at an aisle-most surface of the first seat, and wherein the maximum reflection angle is determined by a second visual perspective that extends a second designated height from the floor and is located at an aisle-most surface of the second seat that is separated from the aisle-most surface of the first seat by the aisle, wherein the first designated height that is a ninety-fifth percentile of male human height, and wherein the second designated height that is a fifth percentile of female human height.

9. The vehicle cabin wayfinding assembly of claim 1, wherein the at least one directional reflector comprises a plurality of parallel reflector segments separated by gaps, each of the reflector segments comprising a plurality of the reflective surfaces disposed side by side along the respective reflector segment, and wherein each of the reflective surfaces is convex along the vertical axis and concave along the longitudinal axis.

10. A vehicle comprising:

a fuselage defining an internal cabin that includes a floor supporting a first seat and a second seat within the internal cabin, the first and second seats disposed in a common row and separated from each other by an aisle along the floor;

at least one light source within the internal cabin disposed above the first seat, the at least one light source configured to emit light across the aisle in a direction parallel to a plane of the floor such that the light passes above passengers in the aisle; and a vehicle cabin wayfinding assembly secured within the internal cabin above the second seat and across the aisle from the at least one light source, the vehicle cabin wayfinding assembly comprising:

a placard having a front face that extends along a vertical axis and along a longitudinal axis that is perpendicular to the vertical axis; and at least one directional reflector offset from the front face of the placard, wherein the at least one directional reflector defines one or more indicia, wherein the at least one directional reflector comprises at least one reflective surface that is convex along the vertical axis and concave along the longitudinal axis, and wherein the at least one directional reflector is oriented at an angle to directionally reflect light received from the at least one light source downward towards the aisle into an application zone, wherein the application zone has a defined lateral width along the length of the aisle that enables passengers that are within a threshold proximity to the vehicle cabin wayfinding assembly to view the light reflected by the at least one directional reflector.

11. The vehicle of claim 10, wherein the directionally-reflected light has an intensity within the application zone that is higher than outside of the application zone.

12. The vehicle of claim 10, wherein the at least one directional reflector is shaped as one or more wayfinding indicia.

13. The vehicle of claim 10, wherein the at least one directional reflector surrounds at least one planar area of the front face that is shaped as one or more wayfinding indicia.

14. The vehicle of claim 10, wherein the at least one directional reflector comprises a plurality of parallel reflector segments separated by gaps, and wherein a height to depth aspect ratio of the reflector segments relative to the front face of the placard is constant.

15. The vehicle of claim 10, wherein the at least one reflective surface outwardly bows away from the front face of the placard.

16. The vehicle of claim 10, wherein the application zone is defined vertically between a minimum reflection angle and a maximum reflection angle, wherein the minimum reflection angle is determined by a first visual perspective that extends a first designated height from the floor and is located at an aisle-most surface of the first seat, and wherein the maximum reflection angle is determined by a second visual perspective that extends a second designated height from the floor and is located at an aisle-most surface of the second seat that is separated from the aisle-most surface of the first seat by the aisle, wherein the first designated height is a ninety-fifth percentile of male human height, and wherein the second designated height is a fifth percentile of female human height.

17. The vehicle of claim 10, wherein the at least one directional reflector comprises a plurality of reflective units, and each of the plurality of reflective units has one of the reflective surfaces that is horizontally concave and vertically convex.

18. A method of efficiently directing passengers aboard a vehicle, the method comprising:

emitting light from a light source within an internal cabin of the vehicle towards a vehicle cabin wayfinding assembly that is secured within the internal cabin proximate to a row of seats, the light source and the vehicle cabin wayfinding assembly disposed along opposite sides of an aisle that separates seats within the row of seats, wherein the light is emitted across the aisle such that the light passes above passengers in the aisle; and directionally reflecting the emitted from the light source with at least one directional reflector of the vehicle cabin wayfinding assembly downward towards the aisle into a defined application zone, wherein the at least one directional reflector defines one or more indicia, wherein the at least one directional reflector comprises at least one reflective surface that is convex along a vertical axis and concave along a longitudinal axis that is perpendicular to the vertical axis, wherein the directionally reflecting operation comprises reflecting light via the at least one reflective surface at an increased intensity within the application zone, and not reflecting light or reflecting light at a decreased intensity outside of the application zone, wherein the application zone has a defined lateral width along the length of the aisle that enables passengers that are within a threshold proximity to the vehicle cabin wayfinding assembly to view the light reflected by the at least one directional reflector.

19. A vehicle comprising:

a fuselage defining an internal cabin;

at least one light source within the internal cabin; and a vehicle cabin wayfinding assembly secured within the internal cabin, the vehicle cabin wayfinding assembly comprising:

a placard having a front face that extends along a vertical axis and a longitudinal axis that is perpendicular to the vertical axis; and at least one directional reflector offset from the front face of the placard and extending from the front face, wherein the at least one directional reflector defines one or more indicia, wherein the at least one directional reflector comprises a plurality of parallel reflector segments separated by gaps, each of the reflector segments comprising a plurality of reflective units disposed side by side along the respective reflector segment, each of the reflective units includes a respective reflective surface that is concave along the longitudinal axis, and wherein the reflective surfaces directionally reflect light that is emitted from the at least one light source into corresponding lateral envelopes within an application zone to provide a pulsating effect as an individual moves through the internal cabin past the vehicle cabin wayfinding assembly.

20. The vehicle cabin wayfinding assembly of claim 1, wherein the at least one directional reflector comprises a plurality of parallel reflector segments separated by gaps along a height of the placard, each of the reflector segments comprising at least one of the reflective surfaces outwardly bowing away from the front face of the placard, wherein each of the reflective surfaces extends vertically from a respective upper point to a respective base point, wherein the upper point and the base point are located at different depths relative to the front face of the placard.

21. The vehicle of claim 10, wherein the vehicle cabin wayfinding assembly is secured on an overhead storage bin above the second seat and the at least one light source is mounted to a ceiling of the internal cabin across the aisle from the vehicle cabin wayfinding assembly.

22. The vehicle of claim 10, wherein the at least one directional reflector comprises a plurality of parallel reflector segments separated by gaps, each of the reflector segments having one or more of the reflective surfaces, wherein the reflector segments directionally reflect the light emitted from the at least one light source into the application zone with a pulsating effect as perceived by a passenger moving along the aisle, and wherein an intensity of the light that is directionally-reflected by the reflector segments is greater within the application zone than outside of the application zone.

* * * * *